J. D. TELLER.
SHOCK ABSORBER AND AXLE REINFORCEMENT.
APPLICATION FILED DEC. 3, 1919.
1,337,291. Patented Apr. 20, 1920.
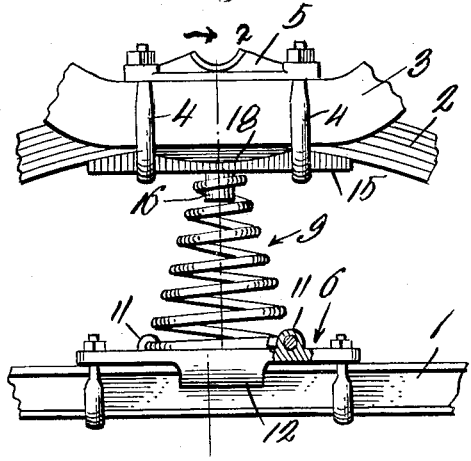
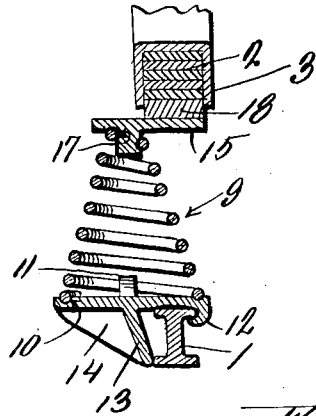
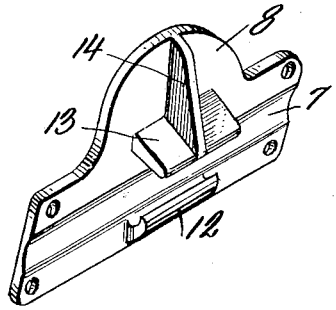
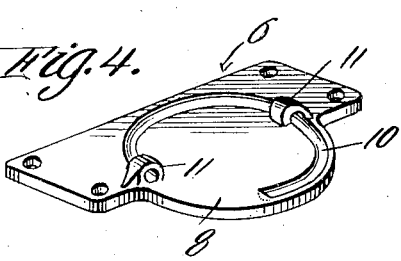
WITNESSES
Guy M. Spring
U. B. Hillyard.
Inventor
JOHN D. TELLER
By Richard B. Owen
Attorney

UNITED STATES PATENT OFFICE.

JOHN D. TELLER, OF HENDERSON, TEXAS.

SHOCK-ABSORBER AND AXLE-REINFORCEMENT.

1,337,291.  Specification of Letters Patent.  Patented Apr. 20, 1920.

Application filed December 3, 1919. Serial No. 342,134.

*To all whom it may concern:*

Be it known that I, JOHN D. TELLER, a citizen of the United States, residing at Henderson, in the county of Rusk and State of Texas, have invented certain new and useful Improvements in Shock-Absorbers and Axle-Reinforcements, of which the following is a specification.

In the operation of motor vehicles of the type embodying a front transverse spring, such as the Ford automobile, it has been found that when rough roads are encountered or the front wheels come in contact with an obstruction the front axle frequently turns, and as a result the radius rods buckle and oftentimes break.

The present invention is designed to reinforce the front axle and spring and compensate for shock and prevent disastrous results when negotiating rough roads, or the front wheels come in contact with obstructions or drop into ruts or depressions which under ordinary conditions would cause trouble.

The drawings illustrate a preferred embodiment of my invention. However, it is to be understood that in adapting the same to meet different conditions, various changes may be made in the form, proportion and minor details of construction, without departing from the nature of the invention as claimed hereinafter.

Referring to the drawings hereto attached:—

Figure 1 is a front view of an intermediate portion of the front axle and spring of a motor vehicle provided with shock absorbing and axle and spring reinforcing means embodying the invention, Fig. 2 is a sectional detail on the line 2—2 of Fig. 1, Fig. 3 is a bottom perspective view of the base plate, and Fig. 4 is a top perspective view of the base plate.

Corresponding and like parts are referred to in the following description and indicated in the accompanying drawings by like reference characters.

The numeral 1 designates the front axle of a motor vehicle, and 2 the front spring which is of semi-elliptic form and connected at its ends with the axle in any preferred way. The front cross member 3 is mounted upon the spring 2 in the usual way and secured thereto by means of U-bolts or clips 4. The block 5 mounted upon the front cross member 3 is secured thereto by the fastening means 4 and is adapted to receive the shaft of the crank handle. These parts are of well known construction and arrangement in the Ford automobile.

A base plate 6 is mounted upon the axle 1 and its lower side is slightly channeled as indicated at 7 to form a seat in which the upper flange of the axle is fitted. The central portion of the base plate is widened as indicated at 8 so as to form a rest for the base of a conical spring 9 mounted thereon. The end portions of the base plate are apertured to receive the members of the U-bolts or clips 4. A spiral or helical groove 10 is formed in the upper side of the base plate 6 and extends approximately three-fourths of a circle. The groove 10 is deep at its rear end and gradually decreases in depth toward the opposite end which vanishes in to the upper surface of the plate. Lugs 11 span the spiral groove 10 at diametrically opposite points and snugly engage over the base volute of the spring 9 so as to retain the same in the groove 10 and properly seated on the plate 6. The lugs 11 are disposed about in line with the rear edge of the plate 6 and in the plane of the rear portion of the axle 1. A rib 12 depends from the front portion of the plate 6 and is disposed centrally thereof and is of hooked form to engage about the forward portion of the upper flange of the axle 1. A lug 13 depends from the plate 6 and engages the rear edges of the top and bottom flanges of the axle 1. The lug 13 is approximately in vertical line with the lugs 11 and inclines forwardly and downwardly and serves as bracing means for the plate 6. A web 14 forms bracing means for the lug 13 and is interposed between the lug 13 and the widened portion 8 of the plate.

A plate 15 forming a seat for the spring 2 has transverse grooves in its end portions to receive the U-bolts or clips 4 and is provided centrally with a depending stud 16 in the outer side of which is formed a spiral groove 17 to receive the upper volute of the spring 9 whereby positive connection is had between the spring and plate. The center portion of the plate 15 is widened so as to make ample provision for proper connection between the spring and plate. On reference to Fig. 2 it will be observed that the spring 9 is located with the major portion in the rear of a plane passing vertically through the spring 2 and axle 1 and as a result the spring 9 serves as bracing means for the axle 1 to prevent the same turning when subjected to unusual or abnormal stress such as experienced when the front wheels come in contact with an obstruction or drop suddenly into a depression. The spring 9 in addition to reinforcing the axle 1 and spring 2 also functions to supplement the action of the spring 2 in neutralizing shock and vibration thereby increasing the life or period of service of such parts. The plate 15 is depressed in its upper side to receive a filler 18 whereby the plate is adapted for receiving the ordinary leaf spring or a leaf spring of the Titanic type.

The coil spring 9 is of conical form and is constructed of rod steel of proper gage to withstand the strain and afford a bracing action so as to resist stress which under ordinary conditions would tend to cause the axle 1 to turn when the front wheels come in contact with an obstruction. The conical form of the spring 9 is preferred because of the symmetrical appearance presented and furthermore because of the variable resistance offered by the several volutes, the resistance being greatest at the apex and decreasing from the apex toward the base. Moreover, the conical form gives a better bracing action to prevent turning of the axle 1.

Having thus fully described my invention what I claim as new and desire to secure by Letters Patent, is:—

1. Reinforcing means for the front axle and front spring, the same comprising a base plate mounted upon the axle and secured thereto and having a depending hook-shaped projection engaging the front flange of the axle, and a depending lug engaging the rear portion of the axle, and a spring mounted upon the plate and arranged to be interposed between the same and said front spring.

2. In a vehicle embodying an axle and a spring mounted upon and secured to the axle, and in the plane thereof, a base plate mounted upon and secured to the axle and having a central portion rearwardly widened, a plate secured to the under side of the spring and having its middle extended rearwardly, and a reinforcing spring disposed between the rearwardly widened portions of the two plates and serving to brace the axle and prevent turning thereof when subjected to abnormal stress.

3. As a new article of manufacture, a base plate having its central portion widened and formed in its upper side with a spiral groove and having lugs spanning the spiral groove, a hook shaped projection depending from the forward portion of the plate and a bracing lug depending from the rear portion of the plate and slightly inclined to the perpendicular.

In testimony whereof I affix my signature.

JOHN D. TELLER.